April 15, 1969     C. F. VAN BENNEKOM     3,438,603

PANEL METER MOUNTING DEVICE

Filed June 9, 1967

INVENTOR
CARL F. VAN BENNEKOM

BY *Richard E. Hosley*

ATTORNEY

United States Patent Office 3,438,603
Patented Apr. 15, 1969

3,438,603
PANEL METER MOUNTING DEVICE
Carl F. van Bennekom, Lynnfield, Mass., asisgnor to General Electric Company, a corporation of New York
Filed June 9, 1967, Ser. No. 644,951
Int. Cl. A44b 21/00
U.S. Cl. 248—27          5 Claims

ABSTRACT OF THE DISCLOSURE

A panel meter fastener. Inverted T-slots in a panel meter housing loosely capture a fastener formed of spring material. A curved fastener section contacts a panel and forces transversely extending tabs on a generally planar fastener section captured in the slot to engage the housing.

Background of the invention

This invention relates to fasteners and more specifically to fasteners adapted to secure a panel meter housing to a panel.

Conventionally, panel meters are mounted to panels by studs and nuts. Threaded studs are formed in the panel meter housing flange and extend through apertures formed adjacent a main housing aperture in the panel. Nuts and lock and washers are then applied to secure the meter to the panel.

To decrease the cost of mounting threaded studs and subsequent requirements for the meter customer to drill the panel, spring clips have been used as a substitute mounting means. While the threaded studs have been eliminated, requirements for preforming studs in the flange for each clip have remained.

Generally, choice of the mounting design utilizing spring clips has resulted in a "soft" mounting so that relatively easy meter removal can be accomplished. However, a soft mounting permits a relatively small force from the rear of the meter, such as may be encountered in fastening leads to the terminals, to displace the meter flange from the panel. Sufficient displacement can cause the clip to release the meter.

It is an object of this invention to provide an improved panel meter fastener.

Another object of this invention is to provide a panel meter fastener which effects an economy of parts and which facilitates assembly and disassembly of a panel meter and panel.

Still another object of this invention is to provide a panel meter fastener which securely fastens the meter to the panel while allowing easy assembly and disassembly. The preformed studs in the prior art also served to locate or align the meter angularly in the panel. In fact, the industry has generally standardized stud position to effect uniformity of alignment and interchangeability of meters. Therefore, another object of this invention is to provide a fastener which permits a simplified alignment means to be used which is compatible with standard means.

Summary

In accordance with one aspect of this invention, a fastener is loosely captured in slots formed in a rearwardly extending portion of the meter after it is inserted through the panel aperture. The fastener is displaced toward the panel, and one portion is forced against the panel. This causes another portion of the fastener to engage the housing material to secure the meter to the housing.

Description of the preferred embodiment

Figure 1:
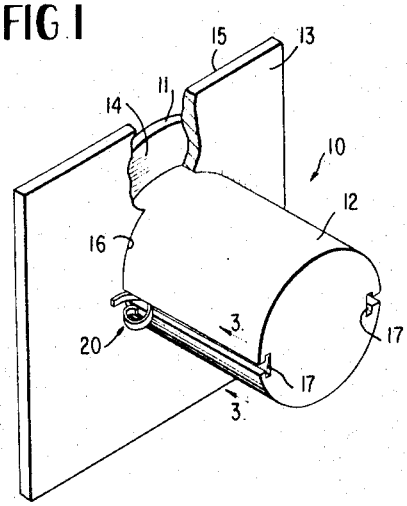
FIGURE 1 generally illustrates a panel meter secured to a panel in accordance with this invention.

FIGURE 1 shows a panel meter housing 10 having a flange 11 and a rearwardly extending meter portion 12 mounted to a panel 13 so that a rear surface 14 of flange 11 engages a front surface 15 of panel 13. Although the rearwardly extending meter portion 12 is shown as being cylindrical, any shape can be used if a panel aperture 16 is formed so that the panel 13 closely fits the rearwardly extending meter portion 12. As illustrated herein, one of a pair of slots 17, described in detail with reference to FIGURE 3, has a fastener 20 disposed therein to secure the panel meter housing 10 to the panel 13.

Figure 2:
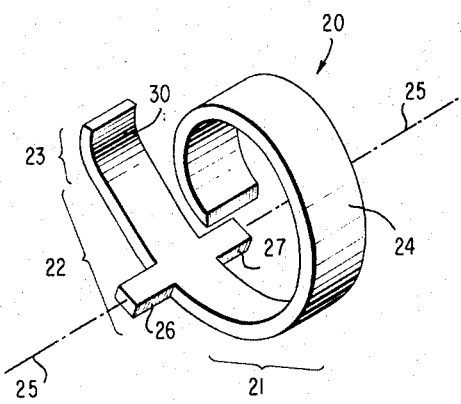
FIGURE 2 perspectively illustrates a fastener in detail.

Referring to FIGURE 2, the fastener 20 is constituted by an integral metal strip, preferably spring material. However, for purposes of explanation, the fastener is considered to have first, second, and third portions 21, 22, and 23, respectively.

The first fastener portion 21 has a curvilinear section 24 which is specifically shown as a spiral formed about an axis 25 transverse to the length of the fastener 20. The second fastener portion 22 is generally planar and includes integral, oppositely extending transverse tabs 26 and 27. A curved section 30 of the third fastener portion 23 is disposed on the same side of the second fastener portion 22 as the first fastener portion 21.

Figure 3:
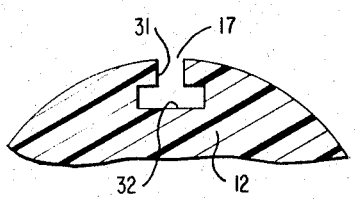
FIGURE 3 presents the details of a slot formed in accordance with this invention and taken along lines 3—3 in FIGURE 1.

As dimensions for the fastener 20 and the slot 17 are interdependent, they must be discussed together. One example of a slot construction which will loosely capture the fastener 20 is shown in FIGURE 3. It is constituted by a partially enclosed channel in the shape of an inverted T-slot having a radially extending portion 31 which extends from a cross slot 32 to the exterior surface of the rearwardly extending meter portion 12. To realize the advantages of this invention, the width of the strip 20 must be maintained less than the width of the radial slot 31 while the transverse dimension of the tabs 26 and 27 must be less than the transverse dimension of the cross slot 32 but greater than the width of the radial slot 31. The tabs 26 and 27 must be thinner than the radial dimension of the cross slot 32 but must also have a diagonal cross-sectional dimension across the ends greater than the radial cross slot dimension.

Functionally, the slot 17 and fastener 20 must be dimensioned to satisfy these criteria:

(1) Fastener 20 must be loosely captured within the slot 17.

(2) Fastener 20 must be longitudinally slidable in the slot 17 when displaced from the panel 13.

(3) Tabs 26 and 27 must be dimensioned to engage the surfaces defining the cross slot 32 when the orientation of the tabs 26 and 27 and the cross slot 32 is altered.

Figure 4:
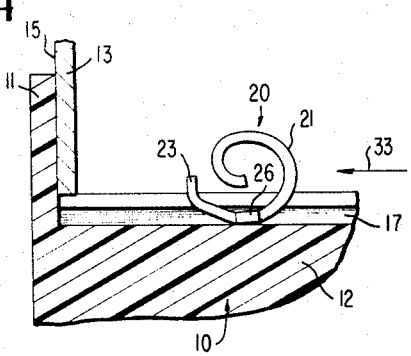
FIGURE 4 shows a fastener located in a slot in a housing and displaced from the panel.

In FIGURE 4 a fastener 20 is located in the slot 17 of the rearwardly extending meter portion 12 after the meter 10 has been inserted through the panel 13 so the flange 11 is against the front panel surface 15. From this view the orientation of one tab 26 can be seen to be generally parallel with the slot 17. Therefore, the fastener 20 is loosely captured in the rearwardly extending meter portion 12 because it can be slid easily along the slot 17 but is held in the slot 17 by the tabs 26 and 27.

Figure 5:
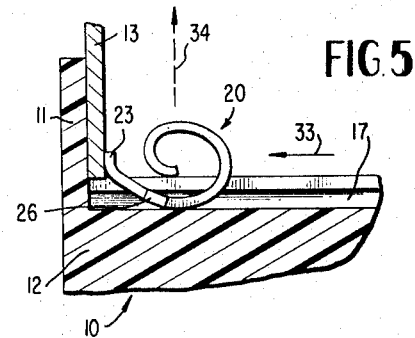
FIGURE 5 illustrates the orientation of the fastener shown in FIGURE 4 when it engages the panel to secure the meter thereto.

A force, designated by arrow 33, is applied to the first portion 21 of the fastener 20 to move it to the position shown in FIGURE 5. For example, the fastener 20 may be moved by hand. When the third portion 23 engages the panel 13, it will, upon further displacement of the fastener 20 toward the panel 13, tend to slide along the rear panel surface radially away from the meter 10. This causes a force moment to be applied to the fastener 20 which alters the position of the tabs 26 and 27 with respect to the slot 17. Sufficient force against the fastener 20 produces a rotation of the tabs 26 and 27 about an axis transverse to a longitudinal axis of the slot 17 until the diagonal corners of the tabs 26 and 27 engage the rearwardly extending meter portion 12.

This movement of the tabs then secures the meter 10 to the panel 13. However, this is not a soft mounting arrangement. Forces tending to displace the meter forwardly and away from the panel merely tend to cause further displacement of the third fastener portion 23 with resulting greater engagement forces between the tabs 26 and 27 and the rearwardly extending meter portion 12.

As partially enclosed, longitudinal channels such as the inverted T-slot 17 are relatively easy to form in a meter housing, it can be seen that only the fasteners 20 are required to provide a secure panel mounting arrangement. Prior art studs or threaded studs in the flange are eliminated. However, if orientation is necessary, then a single stud or protuberance can be molded into the flange at a proper location to provide angular orientation. However, the cost of forming such a single stud or protuberance provides some cost reduction in the manufacture of the meter housing. Assembly is easily accomplished as it is merely necessary to slide the fastener along the slot and into contact with the panel 13.

In addition, disassembly is also easily accomplished when necessary. A generally radially outward force with respect to the rearwardly extending meter portion 12 applied to the first portion 21 causes a countermoment to be produced. Such a force is generally indicated by a dashed arrow 34 in FIGURE 5. When the net moment goes through zero and reverses, the orientation of the tabs 26 and 27 is altered again and they return to a position as shown in FIGURE 4. Removal may be facilitated somewhat by initially pushing the fastener 20 toward the panel 13; this force application tends to free the tabs 26 and 27 from the rearwardly extending meter portion 12. This releases the fastener 20 and permits easy removal of the meter 10. Hence, the compromise of soft mounting to allow easy meter removal is overcome; in accordance with this invention firm mounting and easy removal are both obtained.

As will be obvious to those skilled in the art, many changes can be made in the structural details of the slot and fastener configurations disclosed herein without departing from the true spirit and scope of this invention. In summary, however, the fastener has means adapted to coact with means on a meter housing which normally loosely captures the fastener. Other fastener means engage a panel to cause a force moment to change the orientation of the fastener so that housing engaging means on the fastener contact and engage the housing to securely fasten the housing to the panel.

What is claimed as new and desired to be secured by Letters Patent of the United States is:

1. A fastener means for affixing a flanged housing having a rearwardly extending portion to a panel having an aperture through which the rearwardly extending portion passes, the rearwardly extending portion having a partially enclosed longitudinal channel formed therein defined by nonmetallic materials comprising a fastener formed of an elongated strip having first, second, and third integral, longitudinally extending, contiguous portions, said first portion having a curvilinear section adapted to have a force applied thereto, said second portion having integral, transversely extending tabs dimensioned to be normally freely movable in the channel and said third portion having a curvilinear section adapted to contact the panel to cause a force moment about an axis transverse to the elongated body direction, said tab orientation being altered under the influence of said force moment to engage the housing whereby said fastener secure the housing to the panel.

2. A fastener means as recited in claim 1 wherein said fastener is composed of a spring material.

3. A fastener means as recited in claim 1 wherein said third curvilinear portion forms a spiral about an axis transverse to said elongated body portion and spaced therefrom.

4. A fastener means as recited in claim 3 wherein said partially enclosed longitudinal channel is constituted by an inverted T-slot with a radially extending section disposed between the surface of the housing and a central area of a cross slot portion, the width of said fastener being generally less than the width of the radial slot, the thickness of said transverse tabs being less than the width of the cross slot, the width of said transverse tabs being greater than the width of the radial slot and the diagonal cross-sectional end dimension of said tabs being greater than the radial dimension of the cross slot.

5. A fastener means as recited in claim 1 wherein the rearwardly extending meter portion has a plurality of longitudinal channels formed therein, a plurality of said fasteners individually disposed in each of the channels.

References Cited

UNITED STATES PATENTS

| | | | |
|---|---|---|---|
| 879,343 | 2/1908 | Weiss | 129—31 |
| 1,639,598 | 8/1927 | Edelmann | 248—27 |
| 2,494,669 | 1/1950 | Nodine | 248—27 |
| 2,692,109 | 10/1954 | Schmidt | 248—246 |
| 2,948,141 | 8/1960 | Vahlstrom | 248—27 X |
| 3,278,144 | 10/1966 | Dixson | 248—27 |

ROY D. FRAZIER, *Primary Examiner.*

FRANK DOMOTOR, *Assistant Examiner.*

U.S. Cl. X.R.

24—263